United States Patent [19]

Samples

[11] Patent Number: 5,368,930
[45] Date of Patent: Nov. 29, 1994

[54] THIN ELASTOMERIC ARTICLE HAVING INCREASING PUNCTURE RESISTANCE

[76] Inventor: C. Robert Samples, 300 Kenmore Blvd., Akron, Ohio 44301

[21] Appl. No.: 32,438

[22] Filed: Mar. 15, 1993

Related U.S. Application Data

[63] Continuation of Ser. No. 792,453, Nov. 15, 1991, abandoned.

[51] Int. Cl.⁵ .............................................. B32B 5/16
[52] U.S. Cl. ...................................... 428/323; 2/2.5; 2/161.7; 2/163; 2/168; 428/325; 428/328; 428/331; 428/492
[58] Field of Search ............... 2/2.5, 161 R, 163, 168; 428/323, 328, 331, 324, 325, 492

[56] References Cited

U.S. PATENT DOCUMENTS

| | | | |
|---|---|---|---|
| 2,772,489 | 12/1956 | Porter | 2/2.5 |
| 3,813,281 | 5/1974 | Burgess et al. | 2/2.5 |
| 4,526,828 | 7/1985 | Fogt | 428/229 |
| 4,528,235 | 7/1985 | Sacks et al. | 428/331 |
| 4,623,586 | 11/1986 | Umeya et al. | 428/324 |
| 4,742,578 | 5/1988 | Seid | 2/2.5 |
| 4,771,482 | 9/1988 | Shlenker | 2/161 R |
| 4,810,559 | 3/1989 | Fortier et al. | 2/2.5 |
| 4,864,661 | 9/1989 | Gimbel | 2/167 |
| 4,881,277 | 11/1989 | Hogle | 2/169 |
| 4,901,372 | 2/1990 | Pierce | 2/167 |
| 4,911,985 | 3/1990 | Jenkins | 428/446 |
| 4,917,850 | 4/1990 | Gray | 264/301 |
| 4,951,689 | 8/1990 | Jones | 2/160 |
| 4,962,136 | 10/1990 | Peters | 523/220 |
| 4,987,175 | 1/1991 | Bunnell | 524/449 |
| 5,200,263 | 4/1993 | Gould | 428/323 |

*Primary Examiner*—D. S. Nakarani
*Attorney, Agent, or Firm*—Oldham, Oldham & Wilson Co.

[57] ABSTRACT

A thin elastomeric sheet material with enhanced puncture resistance is prepared by embedding thin plate-like non-elastomeric particles in an elastomeric matrix so that the non-elastomeric particles form lamellae of overlapping plates. The interaction of the embedded particles and the matrix results in a composite sheet material have puncture resistance, at a load application rate in the relevant range for a surgical needle or the like, far superior to either the particles or an elastomeric sheet of equivalent thickness.

9 Claims, 2 Drawing Sheets

THIN ELASTOMERIC ARTICLE HAVING INCREASING PUNCTURE RESISTANCE

This is a continuation of copending application Ser. No. 07/792,453 filed on Nov. 15, 1991, now abandoned.

This invention relates to a composition for thin elastomeric material having enhanced puncture resistance. More particularly, the present invention relates to a thin elastomeric article comprising such material having increased puncture resistance due to the dispersion of lamellae of plate-like particles, especially particles having a thickness much less than either their length or width. Even more particularly, the present invention relates to an article of protective clothing comprising such a thin elastomeric material in the form of a glove or a finger cot.

BACKGROUND ART

The dangers associated with cross contamination between a physician and a patient involving exchange of bodily fluids, particularly blood, saliva, and the like, are well documented. As a result of these dangers, it is becoming increasingly desirable for medical personnel to protect themselves from any injuries that would cause an opening in the skin while in contact with a patient in an invasive medical procedure, such as a surgery. These dangers are particularly heightened in the surgical arena, where a variety of sharpened items such as scalpels, needles, suturing needles, etc. are ever present.

A variety of approaches have been attempted to achieve increased puncture resistance in the thin elastomeric protective devices used for this service. Although the use of thicker and more puncture resistant materials, such as urethane, is known, the detriment in such materials is loss of the tactile sensitivity of the user. For example, extremely small chain mail is available, and is used by some orthopedic surgeons, but the degree of touch required for other specific surgeries, such as neurosurgery or cardiovascular surgery, is such that even the finest of chain mail is far too thick.

Other applications of a composition having such enhanced puncture resistance will be found with relation to protection of the hands and fingers from other puncture-type injuries, as would be encountered in the meat and poultry processing industries, where the contamination danger would be from microbes such as the Salmonella bacillus.

SUMMARY OF THE INVENTION

It is, therefore, a first object of the invention to provide a composition and method for manufacturing a thin elastomeric material capable of being formed into elastomeric articles of manufacture exhibiting enhanced puncture resistance when compared to the otherwise untreated elastomeric material.

It is a second object of the invention to provide an elastomeric article such as a surgical glove, or a finger cot, that is no thicker than the type in standard usage, yet provides enhanced puncture resistance.

It is a further object of the present invention to provide a protective elastomeric article that has the same relative amount of elasticity as the surgical gloves and finger cots known in the prior art.

It is yet a further object of the invention to provide a thin elastomeric protective article, such as a surgical glove or finger cot that has the puncture resistant property either co-extensive over the entire surface area of the article or at least over selected critical areas where a puncture is most likely.

It is yet a further object of the invention to provide a thin elastomeric protective article, such as a surgical glove of finger cot that has tactile sensitivity that is equal to the tactile sensitivity of a natural rubber surgeons glove or finger cot.

These and further objects of the invention are achieved by a thin elastomeric sheet material characterized by enhanced puncture resistance. The material comprises an elastomeric matrix having a thickness aspect that is small relative to either the length or width of the matrix, with at least two layers of nonelastomeric particles embedded in the matrix. Each of the embedded particles has a thickness smaller than either a width or a length of said particle, whichever is smaller. The layers are embedded such that the thickness aspect of substantially all of the particles is essentially parallel to the thickness aspect of the matrix. The preferred ratio of thickness to width and length for the particles is from about 1:5:5 to about 1:500:500, with the especially preferred range being from about 1:15:15 to about 1:200:200. The preferred elastomeric matrices are natural rubber, synthetic rubber and thermoplastic elastomers such as poly(vinyl chloride) and polyurethane. The preferred non-elastomeric particles are metals, ceramics or crystalline minerals, especially those crystalline minerals having a plate-like nature. The preferred non-elastomeric particles will exhibit a hardness on the Mohs scale of at least 5.

Other objects of the invention are achieved by an article of clothing comprising such a thin elastomeric sheet material, such as a glove or finger cot.

BRIEF DESCRIPTION OF DRAWINGS

A better understanding of the present invention will be had when reference is made to the attached drawings, wherein identical reference numerals refer to identical parts and in which.

DETAILED DESCRIPTION OF THE DRAWINGS AND THE BEST KNOWN MODE

Figure 1:
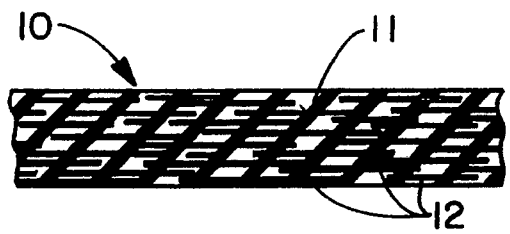
FIG. 1 is an enlarged cross-sectional view of the composite film illustrating the arrangement of the parallel platelets.

Referring first to FIG. 1, the elastomeric thin sheet material 10 of the present invention is shown in cross section. In this Figure, the material comprises an elastomeric matrix 11 having dispersed within it a plurality of layers of particles 12. As noted in FIG. 1, these particles 12 lie essentially flat and parallel to the planar surfaces of the sheet material 10. The dispersion may be achieved by several methods, as described further herein, in which at least formulation for producing such a material 10 is presented. The particles 12 may be selected from several groups, including:

a). the monoclinic crystalline minerals, such as baddeleyite, chloritoid, clinozoisite, chondrodite, euclasite, petalite, sapphire, spodumene, staurolite, and clay;
   b). plate or flake metals, such as copper, brass, bronze, aluminum, steel, iron, monel, cobalt, titanium, magnesium, silver, molybdenum, tin and zinc; and
   c). ceramic flakes or platelets.

As a general rule, the material selected as the non-elastomeric component of the composite should exhibit a hardness on the Mohs scale of at least 5. On the Mohs scale, the scale number increases with increasing hardness, with the scale being bounded by talc, with a Mohs hardness of 1, and diamond, with a Mohs hardness of 10.

A first property sought in selecting the particles 12 to be dispersed in the matrix 11 is a cubic aspect ratio in the range of about 1:5:5 minimum to about 1:500:500 maximum and preferably in the range of 1:15:15 to 1:200:200. When "cubic aspect ratio" is referred to in this application, we mean the ratio of one cubic dimension (thickness, width or length) of a particle to the other two cubic dimensions. By convention, we will always refer to the smallest dimension as the thickness, so the cubic aspect ratios referred to herein will start with that dimension. It is not critical that the non-thickness dimensions of the particles be identical, so, for example, a particle having a width to length ratio of 4:1 would clearly be usable, if other conditions are favorable. Particularly, it is important that the relation of each of the non-thickness dimensions be at least a factor of about 5 larger than the thickness dimension, however, so that a plate-like surface is available for alignment parallel to the surface of the material 10 when the particles 12 are dispersed in matrix 11. In speaking about the relative proportions of the dimensions of particles, we will also refer to thickness as the "y" dimension, with width and length referred to as the "x" and "z" dimensions, respectively. In this fashion, the cubic aspect ratio is defined as the ratio y:x:z. The y dimension is perpendicular to the parallel planes of the platelets and the x and z dimensions make up and define the planes.

Figure 3:
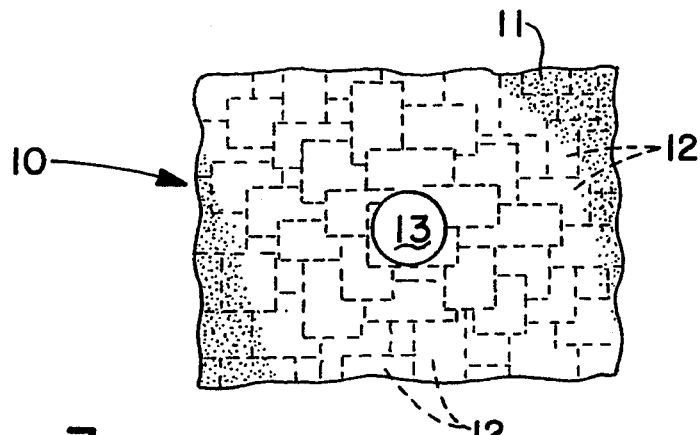
FIG. 3 is an enlarged sectional view taken along Line 3—3 of FIG. 2; illustrating further features of the invention.

The density of the area covered by the particles 12 when viewed normal to the surface of the material 10 (such as the view presented in FIG. 3) should be at least 66%, and even higher areas of coverage, particularly those of at least 90%, are preferred. It is recognized that this area is the area parallel to the x-z plane of the aligned particles.

Because of the plate-like nature of the particles 12, as required by the cubic aspect ratio, the particles will form a series of over-lapping lamellae or courses when allowed to flow within the uncured or unset elastomeric matrix. These lamellae or courses, as shown in the various Figures, render the thin elastomeric sheet material 10 resistant to puncture, but will allow the overall matrix to retain its flexibility. If the sheet material is formed into a protective article of clothing, such as a glove or a finger cot, the presence of the particles 12 will not appreciably reduce the tactile sensitivity of the wearer.

Very uniform parallel planes of platelets can be achieved if the dipping form is vibrated normal to the x-z plane before the solution or latex dries. Several thin layer dips are usually required to form a sufficient number of layers of parallel planes of interleaving particles 12 to significantly improve the puncture resistance of the film. The improvement in puncture resistance can also be accomplished with one heavier dip if there is a uniform dispersion of the platelets in the polymer mix, solution or latex.

Puncture resistant products, either thin sheet material or formed protective wear, may also be produced from dry elastomer mixes of polymer and platelets. The parallel planes of particles 12 are formed during the process of calendaring the material into a thin sheet or during the process of injecting or transferring the material into a mold cavity which defines a thin film product.

The individual particles used must have a cubic aspect ratio from at least about 1:5:5 to as high as about 1:500:500 in order for the parallel planes of particles to effectively reduce puncture resistance. Indeed, higher cubic aspect ratios than 1:500:500 may be effective and, in some applications, desirable. The preferred cubic aspect ratio will be from about 1:15:15 to about 1:200:200.

When the particles are formed into the parallel plates, the distance between individual planes should be between about one-third to about one-half the thickness of the particles, that is, the planes should be separated by a matrix material with a thickness A such that:

$$y/3 < A < y/2.$$

Since the minimal preferred cubic ratio is 1:5:5, then, the ratio of A to the smaller of the width or length will be at such that $$B/15 < A < B/10$$

where B is the smaller of the width or length.

In order to establish and maintain the elasticity and integrity of the sheet material or articles made therefrom, even after repeated stressing, the individual platelets must be firmly adhered to the polymer matrix. This adhesion of the polymer to the platelets also enhances the resistance to puncture by restricting slippage and planar movement of the platelets during a puncture attempt.

Figure 2:
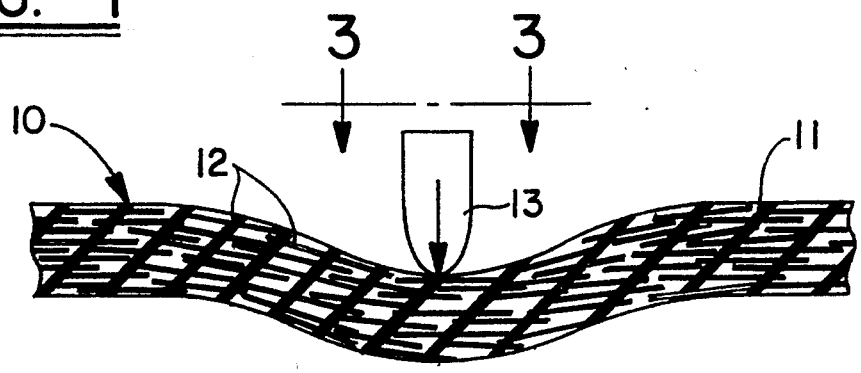
FIG. 2 is an enlarged cross-sectional view of the same composite film shown in FIG. 1 under compression by a sharp pointed tool.
Figure 4:
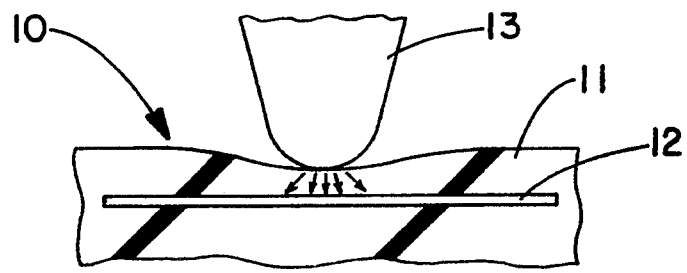
FIG. 4 is an enlarged cross-sectional view taken along the circular area indicated as 4 of FIG. 2 showing the pointed tool compressing the elastomeric matrix as it touches a platelet.

To the best knowledge of the inventor, several distinct physical phenomena appear to be involved in the providing the cumulative effect of a composite film of platelet lamellae embedded in a polymeric matrix with a puncture resistance at least about ten (10) times greater than the puncture resistance of a polymeric matrix of equal thickness but without the embedded lamellae. The first of these is that the puncture resistance of an individual platelet, measured normal to the x-z plane of the platelet, as shown in FIG. 2, where composite 10 is under puncture force imposed by needle 13, is substantially less than the puncture resistance of the composite material, which is in turn substantially more resistant to puncture than the polymer matrix alone. At least a portion of the additional puncture resistance of the composite is gained through the elastomeric cushion provided between the puncturing object and the platelet, as illustrated in FIG. 4. As the puncturing object compresses the elastomeric portion of the composite, the load is distributed over a wider area of the platelet, causing the puncture resistance of the composite material to be greater than that of the platelet alone.

Figure 5:
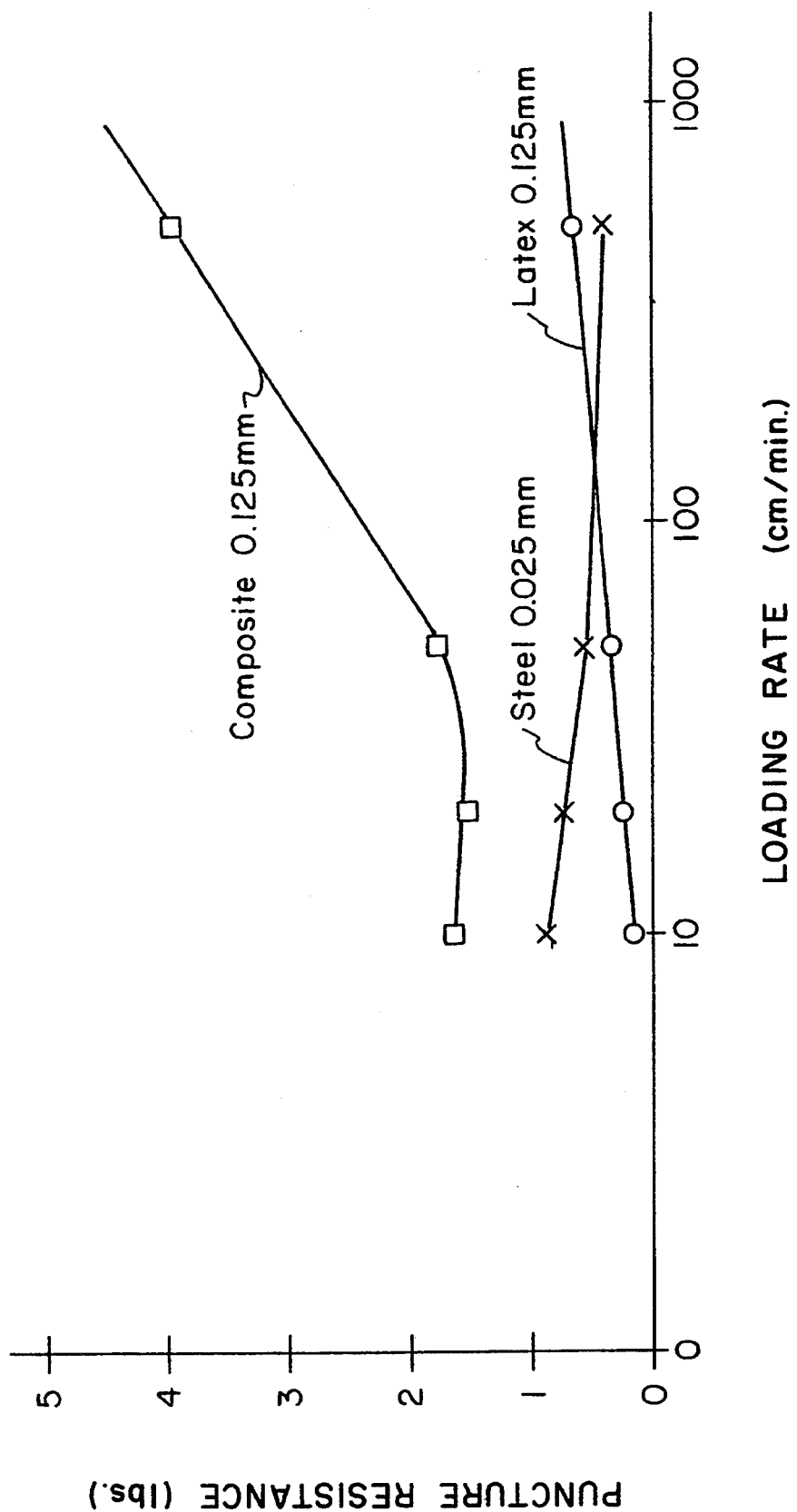
FIG. 5 is a graph showing the relationship between puncture resistance and rate of load application for the present invention, a latex film of equal thickness and stainless steel.

A further increase in puncture resistance of the composite material appears to be related to the variation in puncture resistance with respect to the rate of load application. Puncture resistance in non-elastomeric crystalline solids such as the solids of interest in the present invention generally decreases as the rate of load application increases, that is, puncture resistance is inversely proportional to the rate of load application. This observation is consistent with theory that would predict that the more structured a material is, the more likely it would be to resist a slowly applied load, but also the more likely that it would fail under a rapidly occurring load. By contrast, elastomers exhibit the opposite behavior. Elastomers generally show proportional increase to puncture resistance as the rate of load application increases, due to the time-dependent visco-elastic properties. In FIG. 5, the puncture resistance of natural rubber latex film having a thickness of 0.125 mm is plotted against the logarithm of the load application rate, as well as the puncture resistance of a steel sheet having a thickness of 0.025 mm. The puncture resistance observed for a 0.125 mm thick composite comprising the same elastomer and steel platelets 0.025 mm thick is also presented for comparison. The rate of load application of needles, scalpels, knives, saws and sharp tools in general is greater than 10 cm/min. and frequently in the range of 100 cm/min. to 500 meters/min. Therefore, the composite, at a load application rate in the relevant range for a needle or the like, will exhibit a puncture resistance at least about six times greater than the puncture resistance of either of the component parts alone.

To more fully illustrate the practice of the inventive concept, the following examples are provided.

EXAMPLE #1

A 0.125 mm composite film exhibiting enhance puncture resistance was prepared by cleaning a 2.5 cm×7.5 cm glass slide form in a manner customary in the art and preheating it to 50° C. The form was dipped into a latex formulation described below as "Latex A" and dried for 6 minutes at 82° C. The form was then dipped in a solution described below as "Solution B" and dried for two minutes at 82° C. The form was then passed through a fluidized bed of particles treated with "Treatment C." The fluidized bed was maintained at 25 degrees C. temp and 75 ft/min air flow. The form was then vibrated to cause the particles to align themselves in an x-z plane. This treatment was repeated two additional times, for a total of three repetitions of the protocol. The final composite was cured for 15 minutes at 100° C. in a standard curing oven. After this curing, a composite film of approximately 0.125 mm thickness was removed from the form. The composite film was tested for puncture resistance, as was a film formed from the latex to have approximately the same thickness, as well as a sample of the stainless steel sheet used in producing the platelets. These data as presented in TABLE 1 and shown graphically in FIG. 5.

The puncture resistance test was performed by placing a test specimen beneath a force measuring device, such as an Instron tensile tester, with a surgical needle attached to the load cell spindle. In the particular tests presented in TABLE 1 and FIG. 5, a straight abdominal suturing needle having a triangular point was used. These tests were performed at a loading angle of 0 degrees, that is, the penetrating instrument was 0 degrees from the normal to the surface of the test piece. The velocity of the penetrating instrument relative to the sample was varied from 10 to 500 cm/min for each sample tested. The resistance at which puncture occurred was measured in pounds.

| Latex A | |
|---|---|
| Component | Parts Dry Wt. |
| Natural Rubber Latex | 100 |
| Zinc Oxide | 0.35 |
| Butyl Zimate | 1.0 |
| Sulfur | 0.7 |
| Butyl Namate | 1.0 |
| Ammonium Casinate | 0.2 |
| Potassium Hydroxide | 0.2 |

After thorough mixing of the components, the composition should be adjusted to achieve about 30% solids.

| Solution B | |
|---|---|
| Component | Parts by Wt. |
| Natural Rubber SMR5 CV | 100 |
| Zinc Oxide | 5 |
| Stearic Acid | 2 |
| WINGSTAY L | 2 |
| Sulfur | 2.5 |
| VULCABOND TX | 1.0 |
| Toluene | 4000.0 |

WINGSTAY L is a commercially available product of Goodyear Tire and Rubber Company, Akron, Ohio.

VULCABOND TX is a 50% polyisocyanate in xylene solution that is commercially available from AKZO Chemical Division, Arnheim, The Netherlands.

Treatment C

The platelets or platelet sheet stock were coated with 10% CHEMLOK® 205-235 adhesive system, commercially available through Lord Corporation, Erie, Pa. The coated platelets or sheet stock were dried, coated with Solution B and dried again. The platelets used in Example 1 were die cut on a punch press from treated 0.025 mm stainless steel sheet stock. The platelet diameter was approximately 3 mm.

TABLE #1

| Loading Rate, cm/min. | 10 | 20 | 50 | 500 |
|---|---|---|---|---|
| Loading Angle | 0° | 0° | 0° | 0° |
| | Puncture resistance, pounds | | | |
| Example #1 Composite | 1.67 | 1.55 | 1.78 | 4.0 |
| Equal Gauge Latex Sheet | 0.15 | 0.22 | 0.31 | 0.67 |
| Stainless Steel (0.025 mm) | 0.875 | 0.77 | 0.55 | 0.4 |

The preferred composition of the thin sheet material is produced in the above manner. Similarly, and by use of techniques well known to one skilled in producing rubber products, the glass slide form used in Example #1 may be replaced by a form of a shape known in the art for producing a useful item such as a surgical glove, a finger cot, etc. Variation of the number of dip repetitions may be used to achieve variations in the thickness of the final article. Although the preferred embodiment of the useful article would have uniform distribution of the platelets throughout the composite thin sheet material to protect from puncture uniformly, the technique of selectively dipping certain critical portions of the article to achieve either additional thickness and/or additional platelet coverage would be known to one having ordinary skill in producing such items.

While in accordance with the patent statutes, the best mode and preferred embodiment of the invention have been described, it is to be understood that the invention is not limited thereto, but rather is to be measured by the scope and spirit of the appended claims.

What is claimed is:

1. An article of clothing characterized by increased resistance to puncture, wherein the article of clothing comprises an elastomeric sheet, said sheet comprising an elastomeric matrix, at least a portion of said elastomeric matrix further having at least two layers of non-elastomeric platelets embedded in said matrix such that said elastomeric matrix fills the volume between platelets and is adhered to each said platelets, each said platelet having a thickness aspect that is smaller than either a width or a length aspect of said platelet, whichever is smaller, said layers embedded in said matrix such that the thickness aspect of each platelet is disposed essentially parallel to the thickness of said sheet and wherein the thickness of each said particle is in the range of from about 1/5 times the width or the length to about 1/500 times the width or length.

2. The article of clothing according to claim 1 where the article of clothing is a glove.

3. The article of clothing according to claim 1 where the article of clothing is a finger cot.

4. The article of clothing of claim 1 wherein the thickness of each said particle is in the range of from about 1/15 to about 1/200 times the width or the length.

5. The article of clothing according to claim 1 wherein the elastomeric matrix comprises natural rubber.

6. The article of clothing according to claim 1 wherein the non-elastomeric particles are characterized by a hardness of at least as measured on the Mohs scale.

7. The article of clothing according to claim 6 wherein the non-elastomeric particles comprise at least one metal selected from the group consisting of copper, brass, bronze, aluminum, stainless steel, steel, iron, monel, cobalt, titanium, magnesium, silver, molybdenum, tin and zinc.

8. The article of clothing according to claim 6 wherein the non-elastomeric particles comprise at least one crystalline mineral selected from the group consisting of baddeleyite, chloritoid, clinozoisite, chondrodite, euclasite, petalite, sapphire, spodumene, staurolite, and clay.

9. The article of clothing according to claim 6 wherein the non-elastomeric particles comprise ceramic particles.

* * * * *